United States Patent [19]

Sando

[11] Patent Number: 5,495,928

[45] Date of Patent: Mar. 5, 1996

[54] VEHICULAR CLUTCH ASSISTED OPERATION APPARATUS

[76] Inventor: Koichiro Sando, Villa Erumana A-7, 1-26-6 Sukedo, Ashikaga-shi, Japan

[21] Appl. No.: 301,883

[22] Filed: Sep. 7, 1994

[30] Foreign Application Priority Data

Nov. 30, 1993 [JP] Japan ..................... 5-323389

[51] Int. Cl.$^6$ ..................... F16D 23/12
[52] U.S. Cl. .............. 192/89.29; 192/995; 192/101; 192/110 R
[58] Field of Search ............. 192/89.2, 89.29, 192/101, 99 S, 110 R

[56] References Cited

U.S. PATENT DOCUMENTS

| | | | |
|---|---|---|---|
| 1,860,636 | 5/1932 | Tibbetts | 192/99 S |
| 2,957,358 | 10/1960 | Anderson et al. | 192/89.29 X |
| 3,841,454 | 10/1974 | Pionte | 192/100 RX |
| 5,109,968 | 5/1992 | Pollitt et al. | 192/101 X |
| 5,413,200 | 5/1995 | Hirata | 192/101 X |

*Primary Examiner*—Rodney H. Bonck
*Attorney, Agent, or Firm*—Oblon, Spivak, McClelland, Maier & Neustadt

[57] ABSTRACT

A clutch assisted operation apparatus has a frame to one end of which are attached the bases of a pair of flat springs, with the free ends of the springs extending towards the other end of the frame being pivotally connected to one end of a pair of linking rods, the other end of each of which are supported by a clamp bracket clamped on a clutch cable that passes through the frame. When the clutch lever is not being operated, the free ends of the springs are pushed away from each other.

4 Claims, 7 Drawing Sheets

FIG. 4
FIG. 5
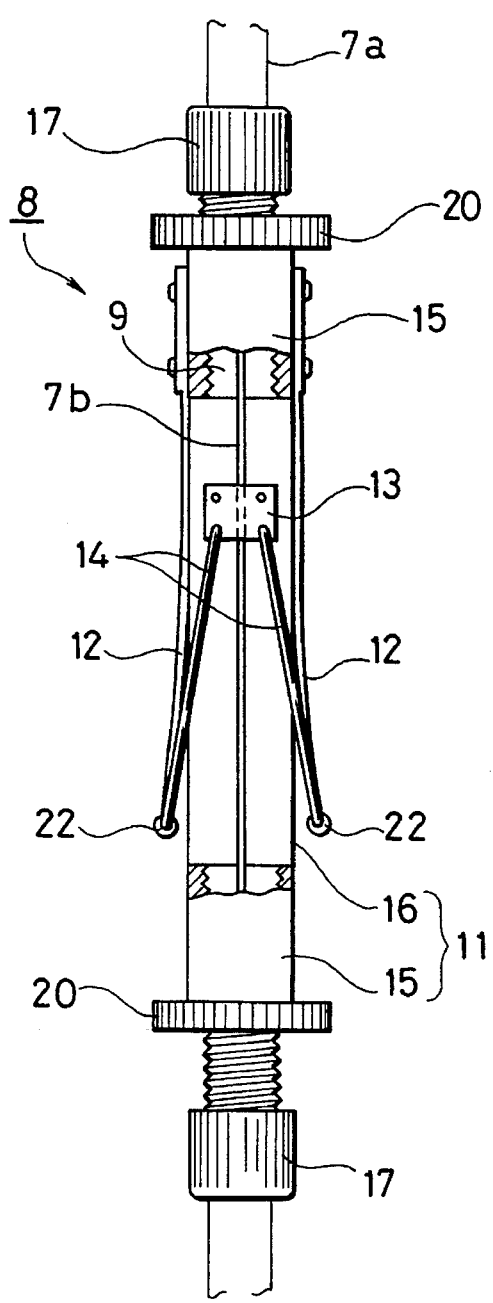
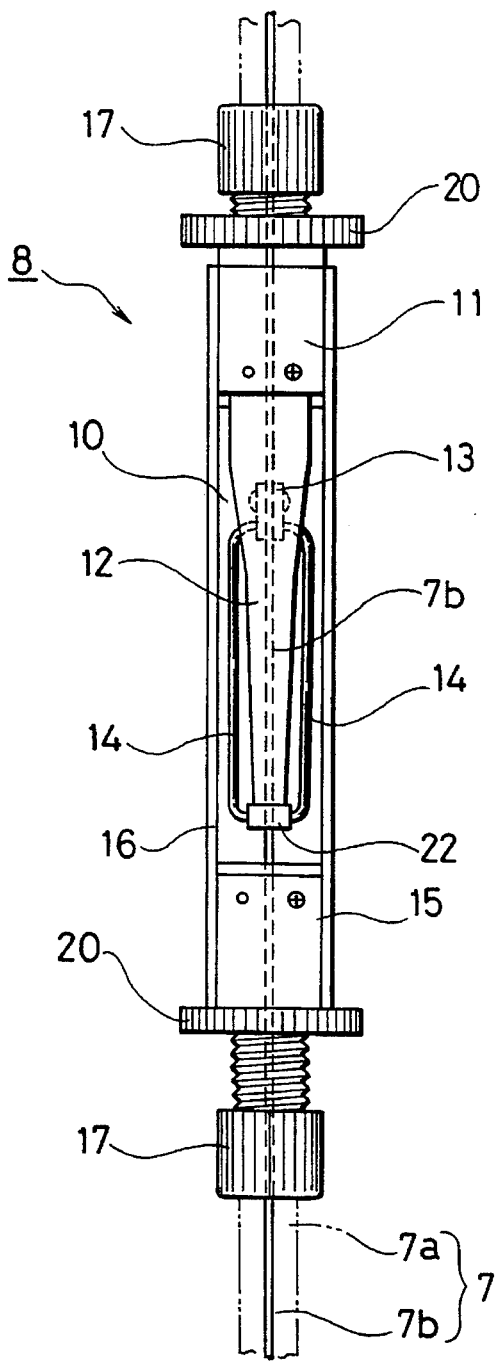

5,495,928

VEHICULAR CLUTCH ASSISTED OPERATION APPARATUS

BACKGROUND OF THE INVENTION

1. Field of the Invention

This invention relates to an assist apparatus for reducing the force needed to operate a manually operated clutch of a vehicle such as a motorcycle.

2. Description of the Prior Art

There is a conventional vehicular clutch assisted operation apparatus that uses an arrangement consisting of an assist spring connected directly to a clutch pedal or to a lever linked to a clutch pedal to reduce the force needed to operate the clutch. However, this mechanism has to be located near the clutch pedal, and because it is also structurally complex and bulky, it is difficult to make it light and compact. It has therefore been difficult to equip a motorcycle or the like with this type of conventional assisted operation apparatus.

An object of the present invention is to provide a vehicular clutch assisted operation apparatus that is small and light, and is not limited with respect to where it can be fitted.

Another object is to provide a vehicular clutch assisted operation apparatus that can be securely operated by a cable even when there are variations in the lengths of cables.

SUMMARY OF THE INVENTION

In accordance with this invention, the above object is attained by a vehicular clutch assisted operation apparatus comprising a frame having end portions provided with holes through which a clutch cable passes and a spaced portion between the ends, two flat springs each having one end affixed to one end of the frame and another end extending towards the other end of the frame, a bracket that is clamped to a clutch cable passing through the spaced portion of the frame and is positioned at the other end when the clutch is engaged and moves together with the cable, two linking rods which are at least shorter than the flat springs, are pivotally connected at one end to the clamp bracket and at the other end to the free ends of the flat springs and which push the free ends of the flat springs away from each other when the clutch is engaged.

Thus, the assisted operation apparatus according to this invention consists of a frame, a pair of flat springs and a pair of linking rods. When the clutch lever is operated, the clamp bracket is moved towards one end. When the clamp bracket crosses an imaginary line between the two points of connection between the flat springs and the linking rods, so that the linking rods form an inclined angle with respect to the imaginary line, the clamp bracket is urged towards one end by the reversionary forces produced by the flexing of the flat springs, thereby reducing the clutch operating force. The assisted operation apparatus according to this invention provides reliable operation, is structurally simple and can readily be made in a light and compact form. In addition, in location, the apparatus is not limited to the vicinity of the clutch pedal but may be provided anywhere along the route of the clutch cable. As such, it can be easily fitted to a motorcycle. Also, a sliding connection between the flat springs and the linking rods can ensure positive, reliable operation even when there are variations in the lengths of operating cables, and also serves to avoid damage to the apparatus.

Further features of the invention, its nature and various advantages will be more apparent from the accompanying drawings and following detailed description of the invention.

BRIEF DESCRIPTION OF THE DRAWINGS

FIG. 4 is a partially cutaway front view of the assisted operation apparatus with the clutch disengaged;

FIG. 5 is a side view of the assisted operation apparatus shown in FIG. 4;

DESCRIPTION OF THE PREFERRED EMBODIMENTS

Figure 1:
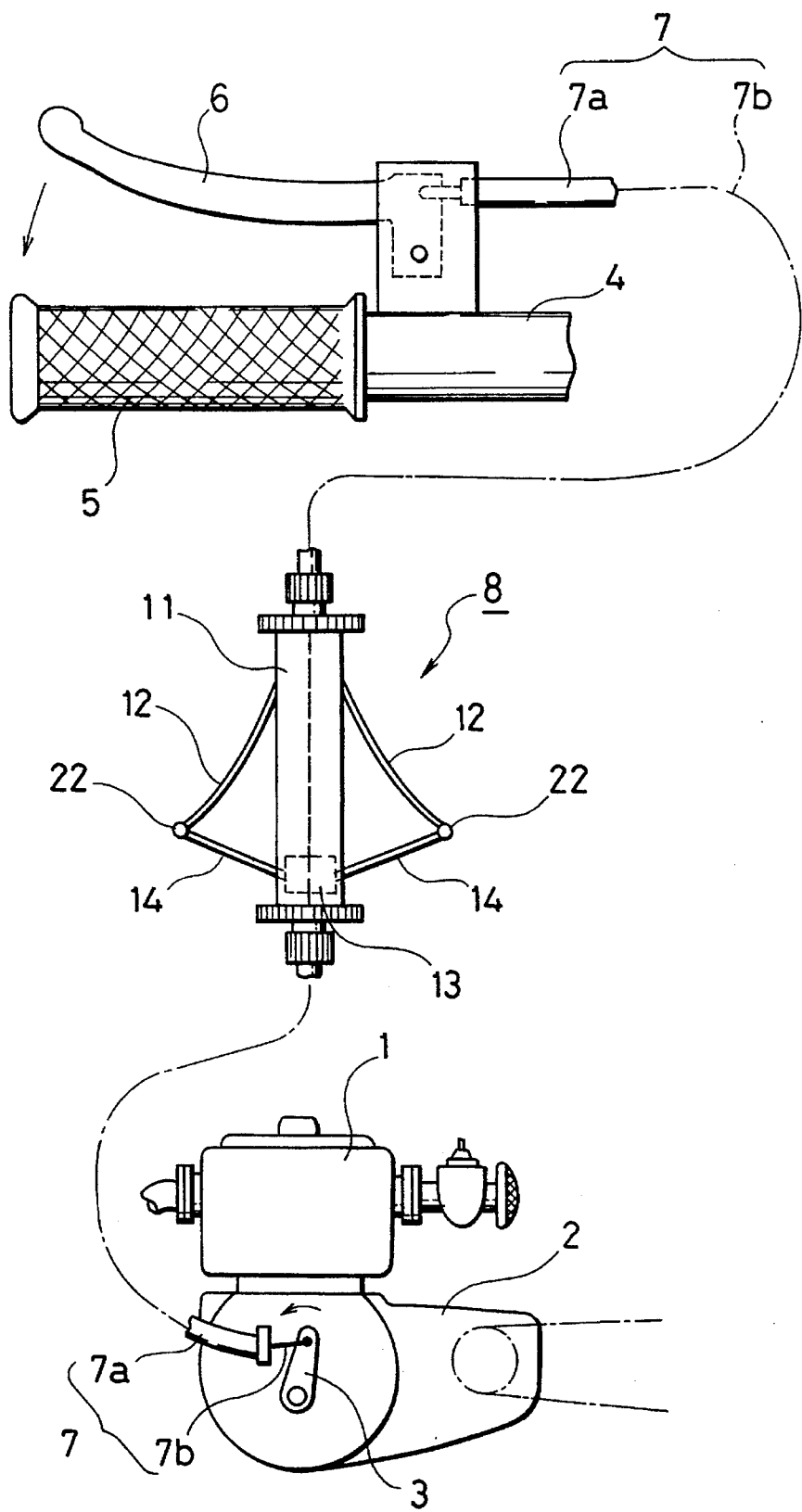
FIG. 1 is an explanatory diagram showing an embodiment of the assisted operation apparatus of the invention fitted to the clutch operating system of a motorcycle.

FIGS. 1 to 5 show a first embodiment of the vehicular clutch assisted operation apparatus of the present invention, applied to the clutch operating system of a motorcycle. The clutch operating system consists of a clutch operating lever 3 provided on the outside of a transmission case 2 that is an integral part of an engine 1, a clutch lever 6 disposed against a grip 5 on the left hand side of a handlebar 4 and a clutch operating cable 7 that connects the clutch lever 6 with the clutch operating lever 3. An assisted operation apparatus 8 according to the invention is fitted at an appropriate point along the route of the clutch cable 7. When the clutch lever 6 is in a released state the clutch inside the transmission case 2 is urged into engagement by a clutch spring or springs (not shown) to thereby transmit motive power. When the clutch lever 6 is gripped and pivoted toward the handlebar 4 in the direction indicated by an arrow in FIG. 1, it pulls an inner cable 7b inside an outer cable 7a, moving the clutch operating lever 3 counterclockwise with respect to the drawing of FIG. 1, thereby causing the clutch to be disengaged, stopping the transmission of motive power.

Figure 2:
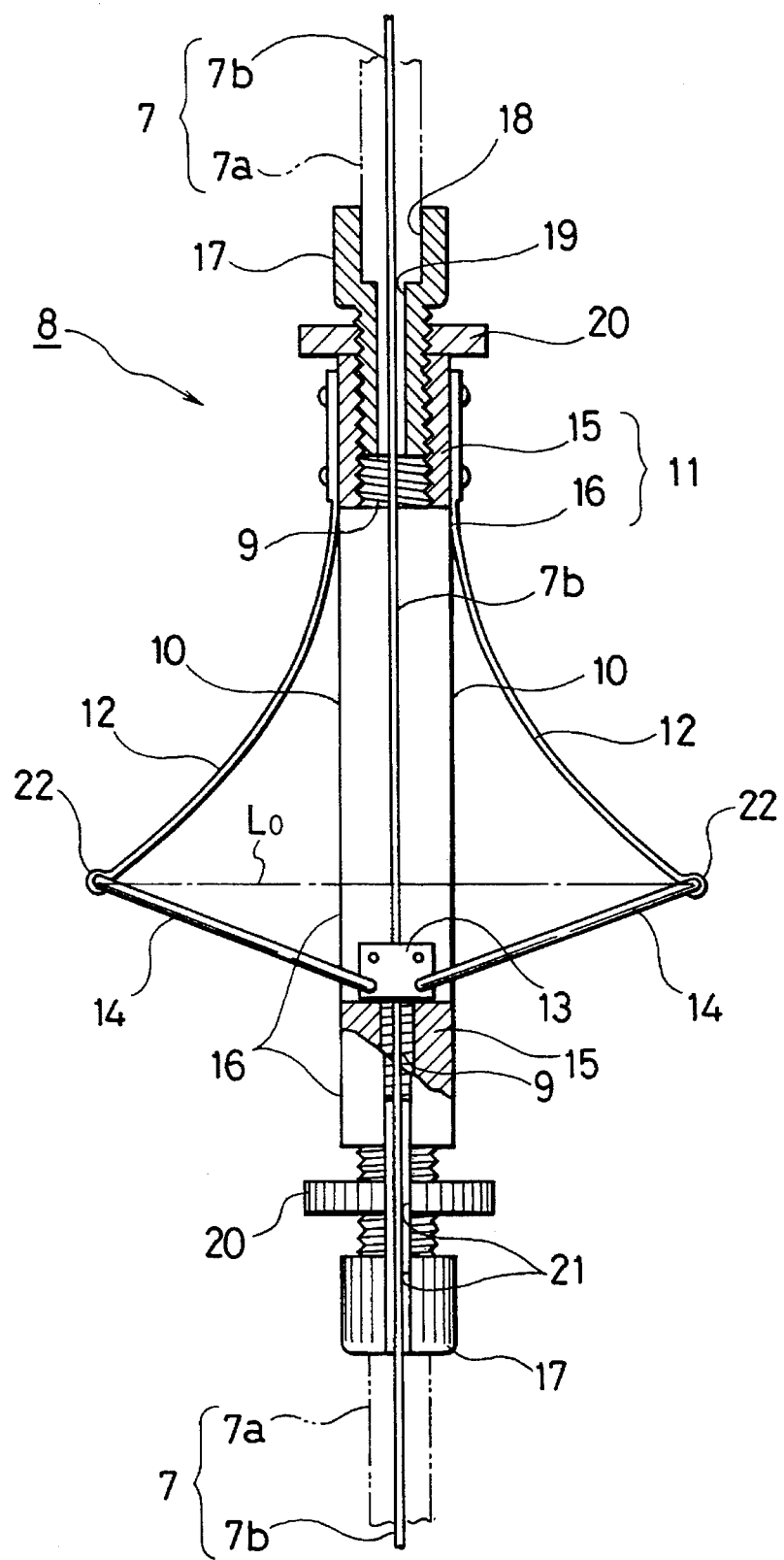
FIG. 2 is a partially cutaway front view of the assisted operation apparatus of FIG. 1 with the clutch engaged.

As shown by FIG. 2, the assisted operation apparatus 8 has at each end thereof a hole 9 through which the inner cable 7b passes, and consists mainly of a frame 11 forming mutually opposed openings 10 at each side (left and right sides, in FIG. 2), a pair of flat springs 12, with the base of each spring being affixed to a side of one end of the frame 11 and the free ends of the springs extending outward in opposition to the openings 10, a cable clamp bracket 13 affixed to the inner cable 7b passing through inside the frame 11, and a pair of linking rods 14, one end of each of which is connected to the cable clamp bracket 13 and the other end to the free end of each of the flat springs 12.

The frame 11 will now be described in further detail. Provided at each end is a block 15 arranged between thin metal side plates 16 and held in place by screws. The front and back of the side plates 16 are left open, forming the openings 10. In the frame 11 of the illustrated embodiment, a female thread is formed on the inner face of the inner cable hole 9 in the blocks 15, which engages with adjusting screws 17. The adjusting screws 17 each have a round socket 18 at one end into which the outer cable 7a of the clutch cable 7 fits, and a hole 19 for the inner cable 7b. These adjusting screws 17 are used to fit the cable properly by carrying out appropriate adjustments to the length of the outer cable 7a. Each of the adjusting screws 17 also has a locknut 20. As shown in the lower part of FIG. 2, the length of the engaged part of an adjusting screw 17 is adjusted with the locknut 20 loosened, and when the adjusting screw 17 has been adjusted the locknut 20 is tightened to lock the adjusting screw 17, as shown in the upper part of FIG. 2. The adjusting screw 17, locknut 20, a side plate 16 and block 15 are provided with a slit 21, shown in the lower part of FIG. 2, which facilitates the fitting of the inner cable 7b.

The flat springs 12 are formed of stainless steel spring strip, for example, are slightly longer than the openings 10, and the free ends are each formed into a tubular joint 22 in which the ends of the linking rods 14 pivotally engage. Screws or the like are used to affix the flat springs 12 to the frame 11, with the base of each spring affixed one side at the end of the frame 11 so that the free ends of the springs extend outward facing the openings 10. Thus, before the flat springs 12 have been connected to the linking rods 14 they extend along the openings 10, and when they are connected the joints 22 are apart from each other. Flat springs 12 that are 0.3 to 0.6 mm thick and have an anchoring portion 10 to 30 mm in length and a curved, extended portion 50 to 70 mm in length will provide sufficient assistance. As shown in FIG. 5, tapering the flat springs 12 towards the joint 22 prevents interference between the springs and the linking rods 14. The joints 22 are not limited to being tubular, but may be of any shape that allows pivotal engagement with the linking rods 14.

The linking rods 14 are rigid members for linking the ends of the flat springs 12 with the cable clamp bracket 13, and in this embodiment may be constituted of rigid wire bent into an approximate U-shape, with the bent portion passing through the joint 22 and the ends being bent into hook shaped portions for pivotal engagement with the cable clamp bracket 13. Thus, the cable clamp bracket 13 functions as a joint for the linking rods 14. The linking rods 14 are at least shorter than the flat springs 12, and with the clutch lever 6 released the cable clamp bracket 13 is positioned on the outside of a line $L_0$ connecting the joints 22 (FIG. 2).

Any arrangement may be used in which the inner cable 7b and one end of each of the linking rods 14 are held by the cable clamp bracket 13 in the frame 11. In the illustrated embodiment the cable clamp bracket 13 is two small metal plates that are screwed together to clamp the inner cable 7b therebetween, and are provided with small holes for engagement with the hooked ends of the linking rods 14. The cable clamp bracket 13 may be of any construction that allows the ends of the linking rods 14 to be pivotally connected and the inner cable 7b to be clamped.

With respect to the positional relationship between the cable clamp bracket 13 and the inner cable 7b, in this embodiment the fixed ends of the flat springs 12 are at the clutch lever 6 end and the other ends (the ends of the flat springs 12 having the joints) are connected at the clutch operating lever 3 end, so that as shown by FIG. 2, with the clutch lever 6 released and the clutch therefore engaged, the position at which the cable clamp bracket 13 clamps the inner cable 7b is at the clutch operating lever 3 end of the openings 10.

When the cable clamp bracket 13 clamps the inner cable 7b at this position, in the four-sided linkage formed by the flat springs 12 and linking rods 14 the joints 22 on the ends of the flat springs 12 are widely separated by the ends of the linking rods 14, in which state one end of each of the linking rods 14 is on the clutch side (in FIG. 2, the lower end) of the imaginary line $L_0$ between the joints 22. This means the extended portions of the flat springs 12 are flexed, whereby the combined reversionary forces of the flat springs 12 urge the cable clamp bracket 13 in the direction of the clutch (downwards, in FIG. 2) until it is stopped by abutment with the block 15.

When at this point the rider moves the clutch lever 6 in the direction indicated by the arrow in FIG. 1, this moves the inner cable 7b in the outer cable 7a, producing a corresponding movement of the cable clamp bracket 13 (upward, with reference to the drawing). Also, the flexing of the flat springs 12 attains a maximum when, as shown on the left side of FIG. 3, the cable clamp bracket 13 is above an imaginary line $L_1$ between the joints 22 of the flat springs 12, that is, when the linking rods 14 form a straight line, but as they are on the line $L_1$, the reversionary forces of the flat springs 12 are acting in opposite directions and therefore cancel each other out, so the urging force acting on the cable clamp bracket 13 is extinguished.

Figure 3:
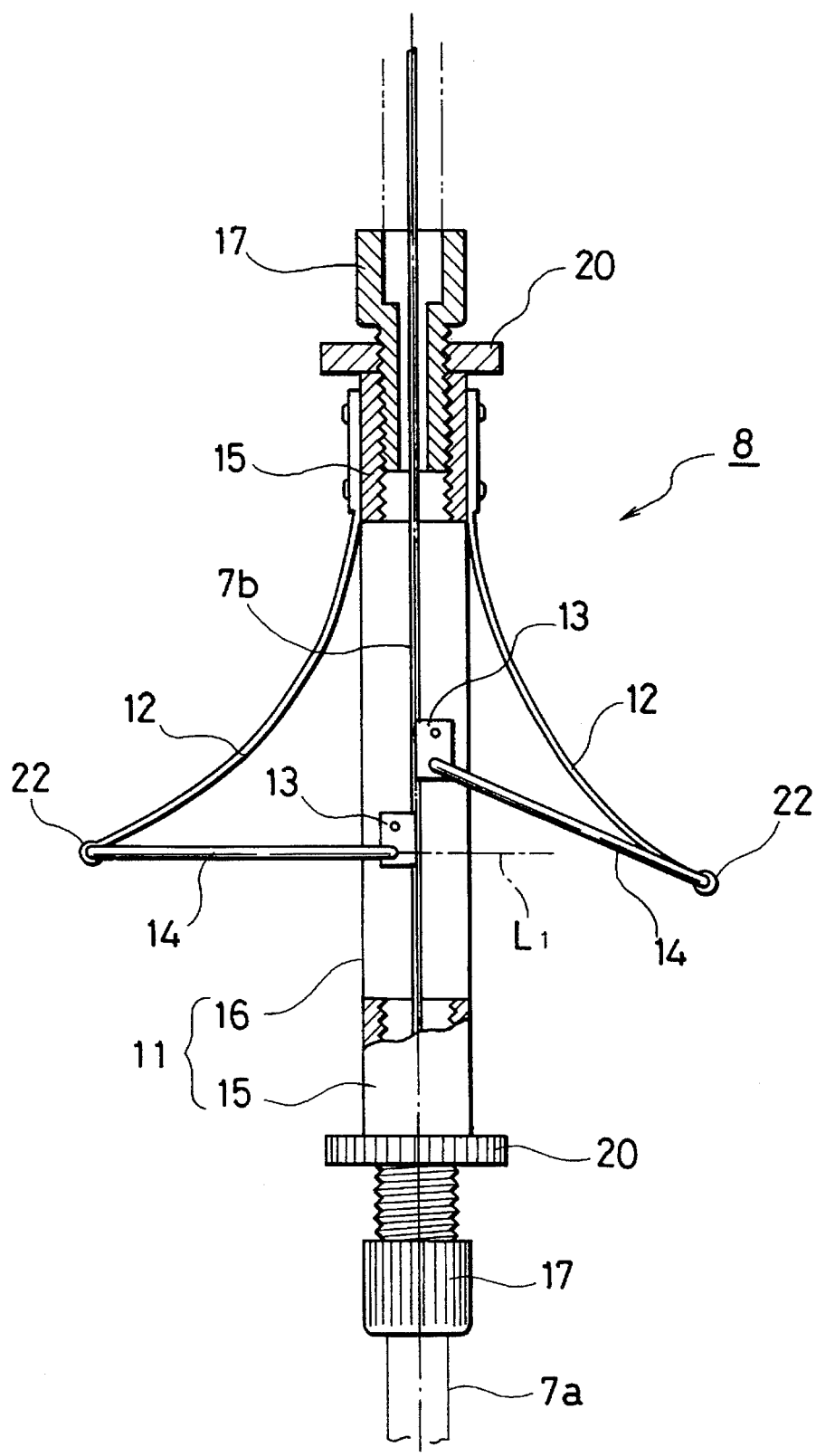
FIG. 3 a partially cutaway front view of the assisted operation apparatus of FIG. 1, in which the half on the left is not providing assisted operation and the half on the right is providing assisted operation urging the cable in the direction of movement.

When further movement of the inner cable 7b causes the line $L_1$ to be passed, as shown on the right side of FIG. 3, the linking rods 14 are inclined relative to $L_1$ so the reversionary forces of the flat springs 12 combine to form a force acting in the same direction as the direction in which the inner cable 7b is moving, urging the cable clamp bracket 13 together with the inner cable 7b. The assistance formed by this urging force reduces the force needed to operate the clutch lever 6. Sufficiently moving the clutch lever 6 with this assistance provides sufficient rotation of the clutch operating lever 3 to disengage the clutch. Even when the clutch is disengaged the force of the clutch spring exceeds the assisting force of the assisted operation apparatus 8, and this reversionary force continues to act on the clutch lever 6, and the clutch is disengaged by operating the clutch lever 6 against that force.

When the clutch lever 6 is released to re-engage the clutch such as after changing gear or the like, the clutch lever 6 is urged back to its original position by the force of the clutch spring which is greater than the assisting force. This movement of the clutch lever 6 is accompanied by a corresponding movement of the inner cable 7b and the cable clamp bracket 13. When the cable clamp bracket 13 is above the line $L_1$, the assisting force formed by the combined reversionary forces of the flat springs 12 disappears, and when the movement of the inner cable 7b causes the cable clamp bracket 13 to pass the line $L_1$, so that the linking rods 14 are at an angle relative to the line $L_1$ on the other side of the line, the reversionary forces of the flat springs 12 combine to form a force acting in the same direction as the direction in which the inner cable 7b is moving, thereby urging the cable clamp bracket 13 together with the inner cable 7b. Therefore, when the cable clamp bracket 13 crosses line $L_1$, the force of the clutch spring combines with the force of the assisted operation apparatus 8 to move the inner cable 7b back to its original position. When the inner cable 7b has moved back enough for the clutch to engage, the cable clamp bracket 13 is stopped, back at its initial position, by the block 15.

Thus, the clutch lever 6 is urged back to its original position by the force of the clutch spring which is stronger than the assisting force, but the rider holding the clutch lever 6 can control the return speed of the clutch lever 6. The degree and speed of clutch engagement can therefore be freely selected by controlling the release of the clutch lever 6, enabling the clutch to be operated in the same way as a conventional clutch system.

Figure 6:
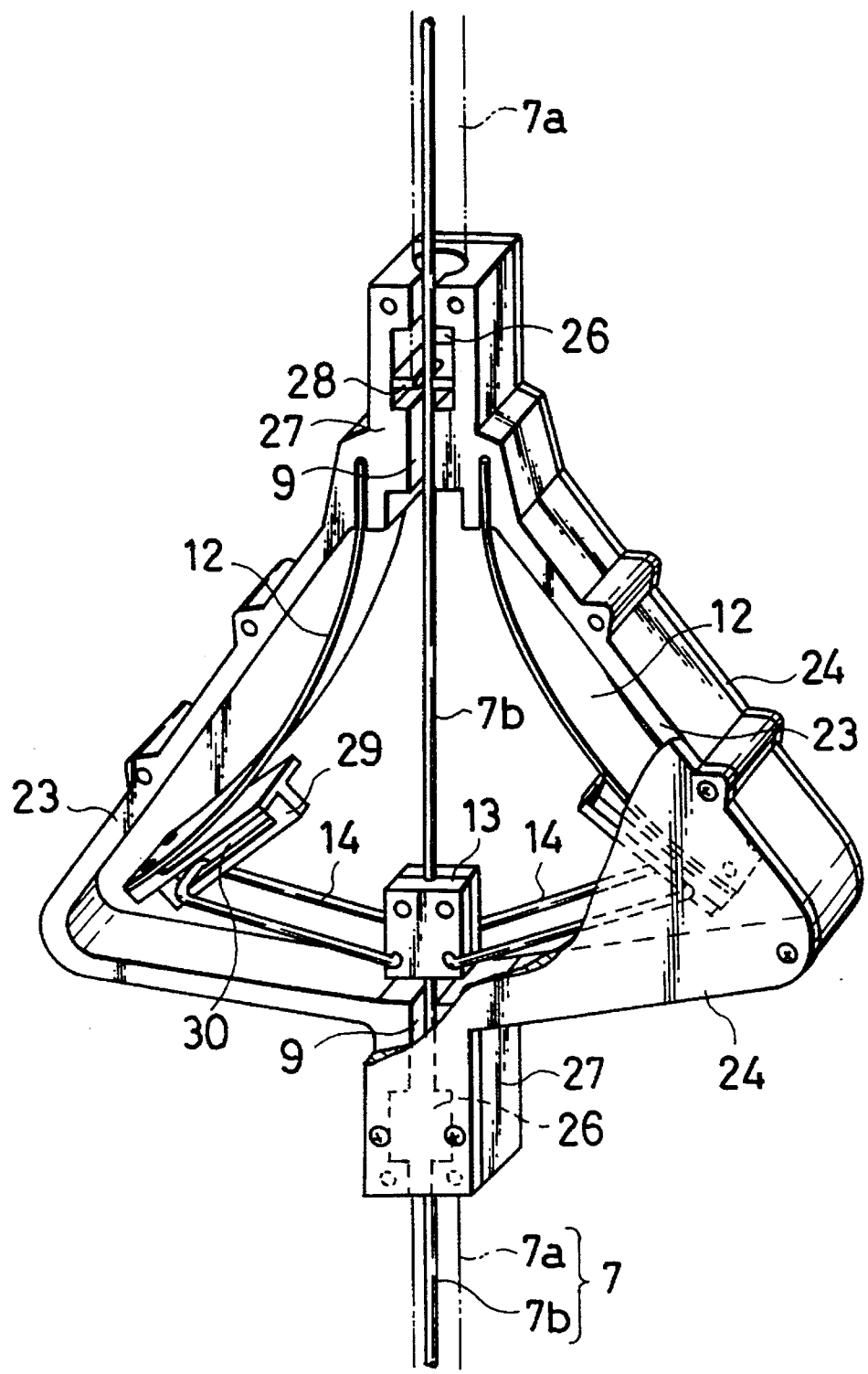
FIG. 6 is a perspective view of another embodiment of the assisted operation apparatus of the invention.

FIG. 6 shows a second embodiment of the assisted operation apparatus of the invention. In this embodiment the frame consists of an approximately triangular frame section 23 and top and bottom covers 24 affixed to the frame section 23 by screws or the like. At each end, the frame section 23 is provided with an encasement 27 with an outer cable hole 26 and an inner cable hole 9. The outer cable 7a is inserted into the hole 26, and shims 28 are used to adjust the length. The encasement 27 on the clutch lever 6 side is provided with a pair of grooves, one on either side of the inner cable hole 9. Into each of these grooves is inserted one end of each of a pair of flat springs 12 of a length that allows the springs to be accommodated within the encasement. To retain the flat springs 12 in place, a hole can be drilled in the ends of the springs that are inserted into the grooves to engage with a projection formed in the grooves, for example. Provided along the free ends of the flat springs 12 are rail members 29 each having an elongated hole or slot 30 formed therein. One end of each of the rail members 29 is fastened to a flat spring 12 by screw means or the like. The strength of the flat springs 12 is adjusted by selecting springs of an appropriate length, width and thickness, or by laminating a plurality of flat spring strips. Instead of flat springs, an arrangement may be used in which strips are used that are urged inward by springs or other means. The rail members 29 are formed of resin having good slidability.

As in the first embodiment, the cable clamp bracket 13 is positioned on the inner cable 7b in the encasement 27 so that it is in contact with the encasement 27 on the clutch operating lever 3 side when the clutch is engaged. One end of each of a pair of rigid linking rods 14 is pivotally supported by the cable clamp bracket 13 and the other ends of the linking rods 14 are engaged in the slots 30 in the rail members 29, so the ends of the flat springs 12 are widely separated. The length of the slots 30 are about the same as the length of the play in the inner cable.

Figure 8:
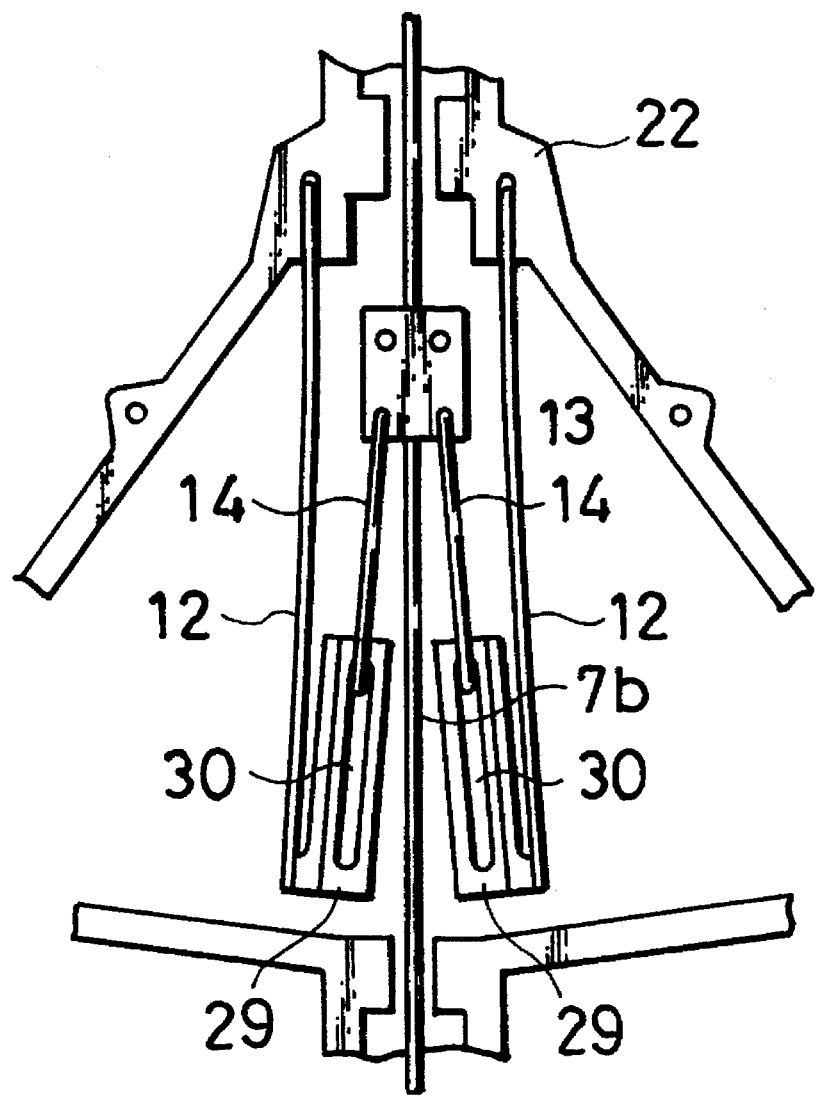
FIG. 8 is an explanatory diagram showing the assisted operation apparatus following the assisted movement of the cable.
Figure 7:
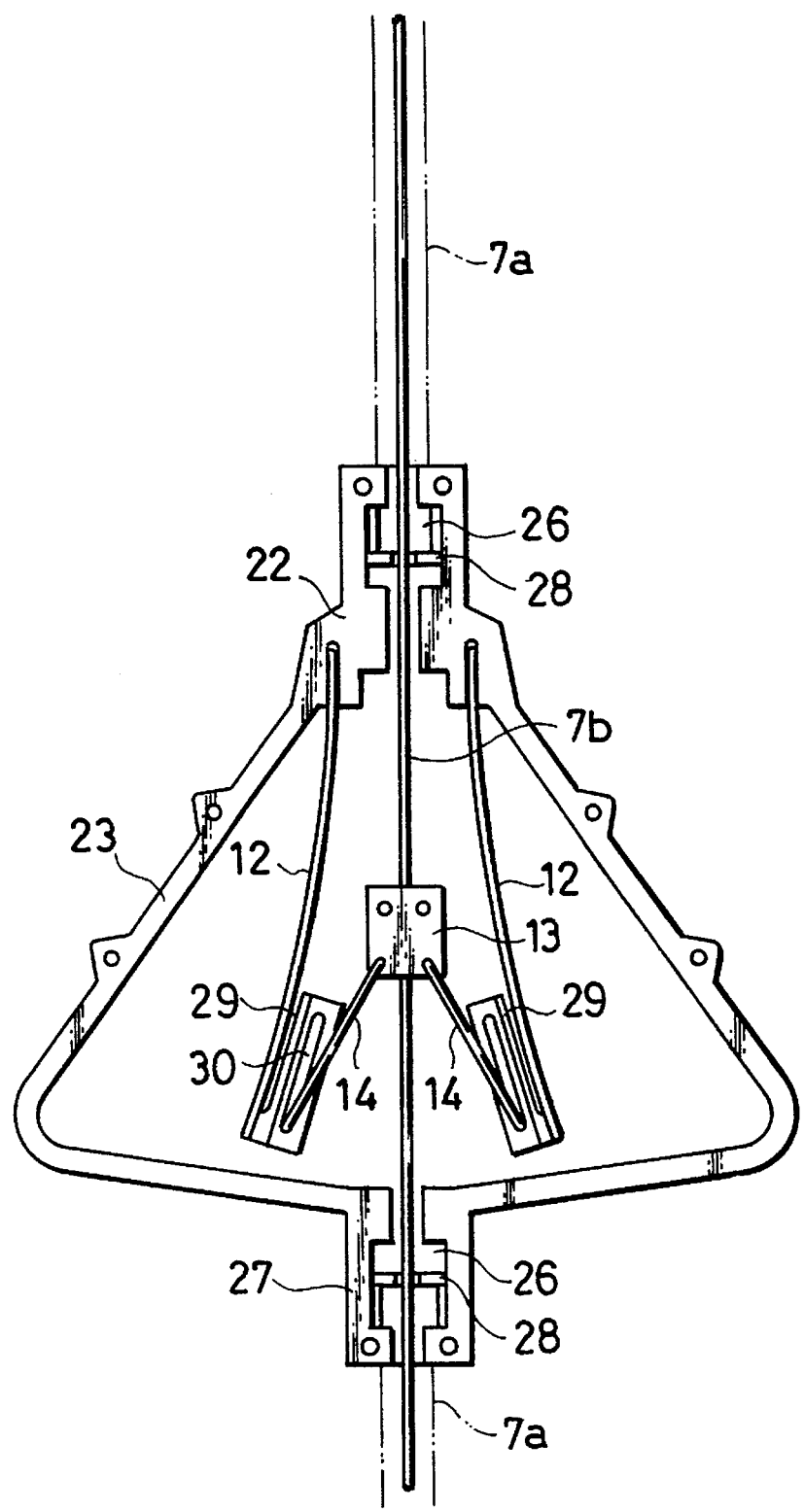
FIG. 7 an explanatory diagram showing the assisted operation apparatus of FIG. 6 assisting the cable in the direction of movement.

In the above assisted operation apparatus, shims 28 are used to adjust the length of the outer cable 7a, so that when the clutch lever 6 is operated, the inner cable 7b is moved upwards (with respect to FIG. 6) together with the cable clamp bracket 13. As shown by FIG. 7, when the cable clamp bracket 13 moves inwards across an imaginary line between the ends of the linking rods 14, the reversionary forces of the flat springs 12 act in the same direction as that in which the cable is moving, reducing the force needed to operate the clutch lever 6. At this point the ends of the linking rods 14 are located at the ends of the slots 30 in the rail members 29, one end of each of which is affixed to the flat springs 12, so the reversionary forces of the flat springs 12 act effectively to the extent needed to disengage the clutch. Even if the inner cable 7b is subjected to further pulling, as shown by FIG. 8, all that happens is that the ends of the linking rods 14 move in the slots 30, so the flat springs 12 are not subjected to excessive force, so there is no damage to the flat springs or to the point of connection with the linking rods. Moreover, the interior of the frame section being sealed by the covers prevents damage or malfunctions caused by impacts with other objects, and rust caused by the intrusion of water.

While the above embodiments were described with reference to the apparatus of the invention incorporated into a motorcycle clutch operating system, the invention is not limited in application to motorcycle clutches. Instead, it can be applied to any clutch operating system in which a clutch cable connects the clutch with the clutch operating section. It can for example be applied to an automotive clutch system which uses a cable connection between the clutch and the clutch pedal. Furthermore, as in the assisted operation apparatus of this invention an assisting force is provided by the combined reversionary forces of the flat springs when the bracket crosses an imaginary line between the ends of the flat springs, it is not limited to being applied from the flat spring anchorage side to the clutch operating section side.

In accordance with the above-described invention, the force needed to operate a clutch can be reduced by the assistance provided by the assisted operation apparatus. The assisted operation apparatus has a simple, straightforward structure and can readily be made lighter. Also, unlike a conventional assisted operation apparatus that is limited with respect to where it can be fitted, the assisted operation apparatus of this invention can be fitted anywhere along the route of the clutch cable, and can therefore also be fitted to a motorcycle.

While the invention can of course be fitted in the course of vehicle production, existing vehicles can also be readily retrofitted with the invention simply by replacing the clutch cable and affixing the assisted operation apparatus on the cable. As the assisted operation apparatus is provided with a mechanism for adjusting for the length of the outer cable, the range of connection options is increased and reliable operation is ensured, even when there are variations in cable operating lengths.

What is claimed is:

1. A vehicular clutch assisted operation apparatus, comprising:

a frame having end portions provided with holes through which a clutch cable passes and a spaced portion disposed between the ends;

two flat springs each having one end affixed to one end of the frame and another end extending towards the other end of the frame;

a bracket that is clamped to a clutch cable passing through the spaced portion of the frame and is positioned at the other end when the clutch is engaged and moves together with the cable;

two linking rods which are at least shorter than the flat springs, are pivotally connected at one end to the clamp bracket and at the other end to the free ends of the flat springs and which push the free ends of the flat springs away from each other when the clutch is engaged.

2. An apparatus according to claim 1, wherein each of the end portions of the frame has a socket in which an outer clutch cable is inserted, and an adjusting screw in which there is a hole through which an inner cable is inserted.

3. An apparatus according to claim 1, wherein a rail member having a slot is affixed to the free end of each of the flat springs and the other end of each of the linking rods engages in the slot.

4. An apparatus according to claim 1, wherein the frame is an approximately triangular frame with top and bottom covers.

* * * * *